United States Patent [19]

Dunning et al.

[11] 4,053,978
[45] Oct. 18, 1977

[54] METHOD OF PREPARING IRON DISULFIDE ELECTRODES

[75] Inventors: John S. Dunning, Warren; Thompson G. Bradley, Rochester, both of Mich.

[73] Assignee: General Motors Corporation, Detroit, Mich.

[21] Appl. No.: 746,822

[22] Filed: Dec. 2, 1976

[51] Int. Cl.² .......................................... H01M 4/04
[52] U.S. Cl. .................................. 29/623.5; 29/623.1
[58] Field of Search ................. 29/623.5, 623.1, 623.4; 429/112, 221

[56] References Cited
U.S. PATENT DOCUMENTS 3,907,589  9/1975  Gay et al. ........................ 429/221 X

*Primary Examiner*—Carl E. Hall
*Attorney, Agent, or Firm*—Lawrence B. Plant

[57] ABSTRACT

Iron disulfide electrodes are prepared by: slurrying the $FeS_2$ in molten sulfur; spreading the slurry into $FeS_2$—S sheets; solidifying the $FeS_2$—S sheets; sandwiching the $FeS_2$—S sheets between porous current-conductor sheets; and heating the thusly formed sandwich to volatize away the sulfur. Flexible $FeS_2$—S sheets are obtained by heating the slurry to about 300° C and then rapidly quenching them in $H_2O$.

4 Claims, 2 Drawing Figures

METHOD OF PREPARING IRON DISULFIDE ELECTRODES

BACKGROUND OF THE INVENTION

This invention relates to iron disulfide (FeS$_2$) electrodes for high temperature, molten salt batteries such as lithium/alkali metal halide/iron disulfide batteries (e.g., Li/LiCl-KCl/FeS$_2$). The overall reaction for that battery is essentially:

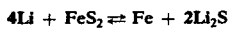

$$4Li + FeS_2 \rightleftarrows Fe + 2Li_2S$$

wherein the Li and the FeS$_2$ are respectively the negative and positive electrodes which, during discharge, combine electrochemically (after a number of intermediate steps) to form iron and lithium sulfide.

The lithium in the negative electrode may be either a liquid or a solid. In the liquid state, the lithium is typically capillarily contained within the interstices of a porous wick or matrix (typically metal) such as is disclosed in Craig U.S. Pat. No. 3,560,265 (issued Feb. 2, 1971) or Bradley et al. U.S. Pat. No. 3,532,549 (issued Oct. 6, 1970). In the solid state, the lithium is typically alloyed with another material (e.g., aluminum or silicon) which raises its melting point above the cell operating temperature, but also reduces its effectiveness.

The iron disulfide in the positive electrode is a granular material and, as such, has required means for substantially immobilizing the granules while they are being integrated into the electrode during assembly. Normally binders (i.e., permanent or temporary) are used for this purpose. Temporary binders are removed, as best as possible, after the FeS$_2$-binder has been integrated with appropriate current collectors during assembly. Substantially complete removal of the binder from the FeS$_2$ in the electrode has been considered essential to long-lived cells which are intolerant of impurities. In this regard, these cells are so impurity sensitive that even the construction materials are preferably purified to reduce the likelihood of cell contamination, since some contaminents accelerate corrosive attack of the cell's construction materials, while others, particularly those which form gas bubbles at cell operating temperatures, are particularly deleterious to the electrode's effectiveness.

It is an object of the present invention to prepare iron disulfide electrodes by temporarily immobilizing the FeS$_2$ in an easily useable, readily-removable, and chemically/electrochemically compatible binder during its integration with the electrode's current collectors.

This and other objects of the invention will become more readily apparent from the following detailed description thereof in which:

FIG. 1 is a partially sectioned, side elevational view through the diameter of cylindrical Li-FeS$_2$ cell having a laminated positive electrode made with FeS$_2$ immobilized in accordance with the present invention; and FIG. 2 is an enlarged view of the positive FeS$_2$ electrode of FIG. 1.

THE INVENTION

This invention comprehends: slurrying iron disulfide granules with molten sulfur; integrating the slurry with a current collector; and volatizing away the sulfur to provide a relatively uniform distribution of FeS$_2$ and current collector throughout the electrode. In a particular embodiment, the FeS$_2$-S slurry is sheeted as by spreading or rolling. The sheet is solidified and laminated together with porous current collector sheets to form the finished electrode structure. Preferably, the slurry is heated to at least about 250° C and then rapidly quenched to impart flexibility to the sheet, which flexibility is not present for any extended period of time when quenching from lower temperatures. The finished electrode is then heated at an appropriate temperature and pressure to volatize and substantially remove the sulfur from the electrode leaving the FeS$_2$ contained in the electrode by the current collectors.

Thin FeS$_2$-S sheets made from molten slurries solidified from just above the melting point of S to about 250° C become quite brittle and friable within minutes after quenching, and hence require rather delicate handling thereafter. These sheets can be rendered more flexible, however, by heating the slurry to at least about 250° C and preferably to approximately 300°-325° C followed by rapid quenching to fix the amorphism achieved at these temperatures. The amorphism of FeS$_2$-S wafers so fixed has been retained for as long as about 18 months by storing at approximately −18° C and is sustained at room temperature for many hours to permit less delicate handling procedures. It has been observed that maximum flexibility with minimum sulfur loss is achieved in the 300°-325° C temperature range. In this regard, higher temperatures (i.e., 350° C) improve flexibility, but care must be taken to prevent burning and loss of sulfur from the slurry. Sulfur ignition and loss may be reduced by minimizing the air available to the sulfur and/or heating in a substantially closed environment.

The FeS$_2$-S can be integrated with appropriate current collectors in a number of ways including, but not limited to, co-extruding with the collector, sheeting and laminating with the collector, sheeting onto the collector, etc. Likewise, the shape that the electrode takes is dictated only by the overall cell design rather than any limitations of the FeS$_2$ electrode itself, and the FeS$_2$-S slurry technique of this invention lends itself to fabrication to a variety of shapes, e.g., tubes, planar laminates, spiral laminates (i.e., jellyroll-like FeS$_2$-S-collector coils), etc. A presently preferred technique for integrating the FeS$_2$-S with the electrode's current collectors is to sheet the FeS$_2$-S into self-supporting wafer-like sheets and sandwich the sheets twixt planar laminae of porous current collector sheets (e.g., graphite cloth). Alternatively, the FeS$_2$-S is sheeted directly onto sheets of the porous current collector and these composites laminated together to form the basic electrode structure.

In the presently preferred electrode fabrication technique, flexible FeS$_2$-S sheets are stacked tightly twixt alternating layers of porous conductive current-collector sheet to form a multi-layered laminate-electrode. In the most preferred form, the molten FeS$_2$-S is applied directly onto the porous conductive sheet which supports the FeS$_2$-S layer, and this composite is used to complete the multi-layered laminate-electrode. Following complete assembly of the electrode, the assembly is heated at an appropriate temperature and pressure (i.e., vacuum) to volatize and substantially completely remove the sulfur therefrom, whereby the unbound FeS$_2$ granules are held in situ between the porous current collector laminae. The thusly formed electrodes are porous which porosity comprises the pores of the current collectors and the voids left by the evacuated S. These pores are ultimately filled with the molten salt electrolyte, which is preferably done by vacuum impregnation either before or after the electrode is assembled into the cell container. Some of the electrolyte salt used to fill the pores may be mixed with the $FeS_2$ and S mix and left within the electrode upon vaporization of the sulfur. Moreover, conductive particles (e.g., graphite, molybdenum, etc.) may be included in the $FeS_2$-S mix to enhance the conductivity of the electrode.

DETAILED DESCRIPTION OF THE INVENTION

Successful electrodes have been made in accordance with this invention by mixing about 20 percent by weight precipitated powdered sulfur and the balance 100 mesh $FeS_2$. The amount of sulfur required is not critical — rather all that is required is a sufficient amount to insure ready flowability of the slurry during sheeting and sufficient bonding of the $FeS_2$ during the electrode assembly. Lower amounts make the slurry somewhat more difficult to sheet and less flexible after quenching. Higher amounts of sulfur over that required for sheeting and bonding offers no particular benefits and decreases the capacity of the electrode for any given $FeS_2$-S loading. In this regard, finished electrodes should have sufficient porosity not only to permit filling with molten electrolyte, but also to provide room for the approximately 2 ½ times volumetric increase that results from formation of Fe and $Li_2S$ from the $FeS_2$. An overall, charged state porosity of about 62 percent has been found adequate for this purpose, and this includes the porosity of the interlaminated conductive current collector and the $FeS_2$ layer.

The porous conductive current collector sheets interlaminated with the $FeS_2$-S sheets serve to hold the $FeS_2$ substantially uniformly distributed throughout the electrode and to conduct current to all the reaction sites within the electrode. As a result, compositionally these current collectors need only be formed of materials which are electrically conductive and chemically/electrochemically inert to the cell's operating environment. Plain woven graphite cloth like that provided by the Carborundum Corp. under the designation GSGC-2 cloth and expanded molybdenum mesh like that provided by Amax Specialty Metals Corp. under the designation 10 Mo 20-2/0 have proven useful. Other similarly constructed conductive materials (e.g., screen, open cell metal foam, etc.) would also be acceptable.

After the electrodes are assembled, they are heated to volatize the sulfur. This is preferably accomplished at a temperature of about 250° C at atmospheric pressure. Obviously many temperature-pressure combinations would accomplish this same result, and about the only precaution that need be observed is that the temperature and pressure be selected so as to avoid boiling of the sulfur and minimize any sulfur loss from the $FeS_2$ itself.

Figure 1:
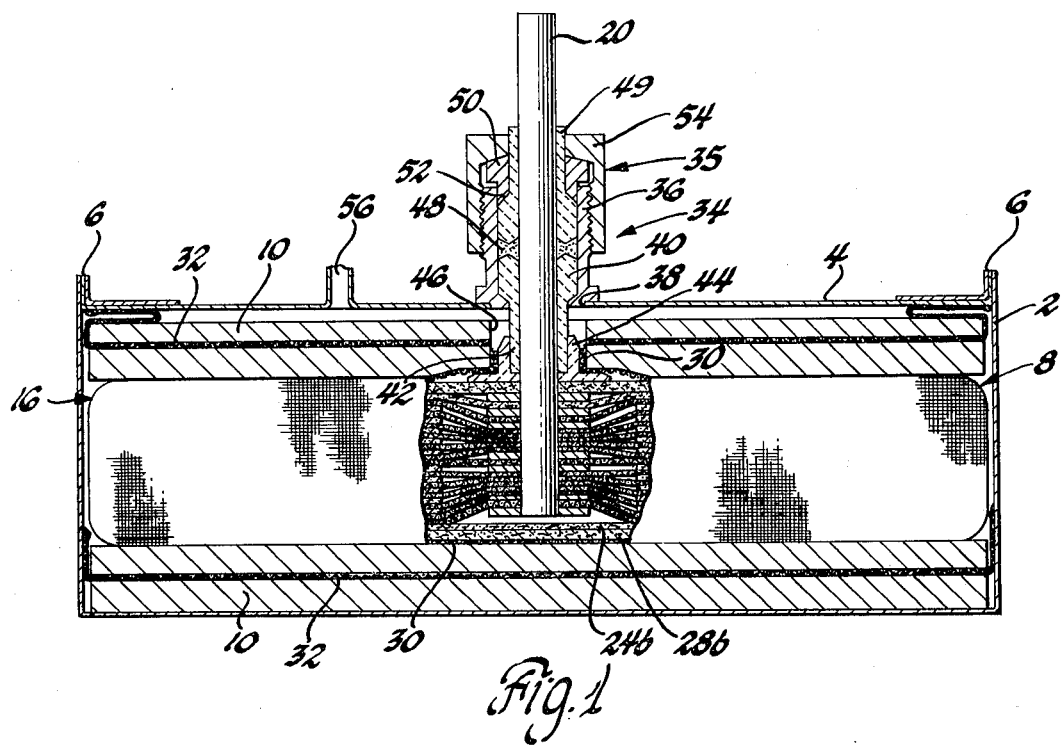
Figure 2:
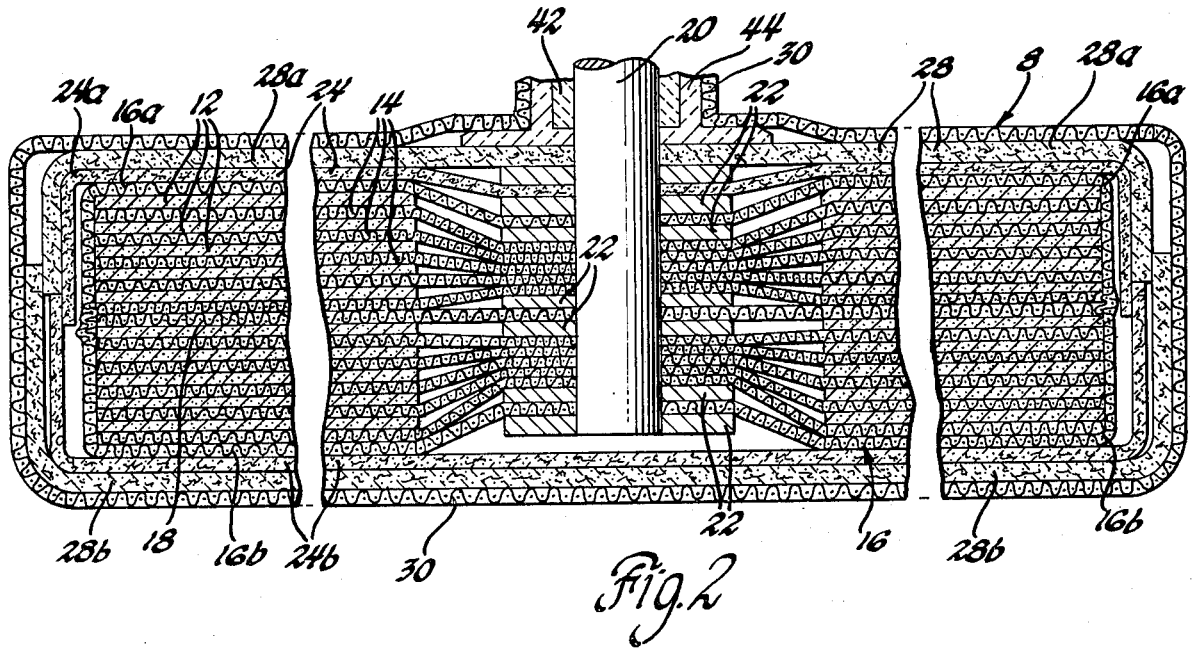

FIGS. 1 and 2 illustrate, by way of a specific example, a LiAl/LiCl-KCl/$FeS_2$ cell having a planarly laminated $FeS_2$ electrode made in accordance with this invention. The battery comprises a right circular cylindrical stainless steel can housing 2 having an outside diameter of about 11.5 cm and a height of about 3.5 cm. A stainless steel top 4 is welded to the upper edge of the can 2 along the abutting can-top flanges 6. The positive $FeS_2$ electrode 8 comprises a basketed laminate of $FeS_2$ 12 and graphite cloth 14 (described hereinafter) with an overall thickness of about 1.4 cm (top to bottom) and diameter of about 10 cm which gives an effective reaction area of about 163 $cm^2$ when centered between two negative electrodes 10 having outside diameters of about 11.2 cm. The positive electrode 8 had sufficient $FeS_2$ to provide about 115 ampere-hours (theoretical) against lithium-aluminum alloy (i.e., 55 mole percent Li) negative electrodes 10 having a lithium capacity of about 57.5 ampere-hours. Using the LiCl-KCl eutectic (M.P. 352° C) this cell was cycled near 450° C for over 700 times with a current efficiency which declined from in excess of 95 percent at the beginning to 20 percent of the end, and had a maximum specific of 115 watt-hrs/kg and peak specific power of 90 w/kg.

The positive electrode 8 included 10 disc-shaped layers 12 of $FeS_2$ alternately stacked with 10 disc-shaped layers of graphite cloth 14, as above. The graphite cloth discs 14 were about 10 cm in diameter and about 0.5 mm thick. A molybdenum mesh layer 18 was used as the centermost current collector and provided improved conductivity over all-graphite current collector structures. Each $FeS_2$-S layer 12 was 1.2 mm thick and comprised 20 percent by weight S and the balance 100 mesh $FeS_2$ granules sheeted as a molten slurry at a temperature of about 300° C. In this regard, a thin stainless steel mold was used to confine the slurry during sheeting and to transport it into the room temperature distilled water quench while followed immediately after sheeting. The mold was a 20 mil thick sheet of stainless steel having a circular mold cavity formed on its surface with 40 mil wire. The stainless steel mold was first coated with a thin layer of $MoS_2$ to act as a parting agent. After filling the cavity with the $FeS_2$-S, a second stainless sheet was clamped over the cavity to substantially seal it off. The mold was placed in a covered glass dish for heating on a 300° C hot plate. A blob of sulfur was placed atop the stainless cover and observed during heating. The sulfur blob melted into a thin liquid then became more viscous and turned brown at which time (about 4–5 minutes) heating was stopped and the mold quickly quenched in water. Following quenching, the mold and $FeS_2$-S was immersed in liquid $N_2$ to temporarily stiffen the $FeS_2$-S for removal from the mold by flexing same slightly.

The aforesaid sandwich of alternating layers of $FeS_2$ 12 and graphite cloth 14 was encaged in a molybdenum mesh basket 16 to hold the several laminae 12, 14 and 18 tightly together and to provide overall shape firmness and enhanced conductivity to the electrode 8. In this regard, (see FIG. 2) expanded molybdenum mesh 16 (i.e., 10 Mo 20-2/0 mesh) was pressed into two dish-like portions 16a (upper) and 16b (lower) which nest together, as shown, to form the basket 16. Molybdenum washers 22 were electron beam welded to the molybdenum mesh basket portions 16a and 16b as well as the central portion 18. The washers 22 are later welded to a molybdenum rod 20 which serves as the positive electrode lead for the battery after exiting the top of the cell through an appropriate electrical insulator discussed hereinafter. Small molybdenum wires (not shown) secured the several layers 12, 14 and 18 together as well as the upper and lower basket halves 16a and 16b respectively. Axial compressive force was then applied to washers 22 compressing the carbon cloth center of the electrode 8 to approximately two thirds its original thickness followed by electron beam welding of the washers 22 to the rod 20 to maintain this compressed condition. The nesting peripheral edges of the upper and lower portions 16a and 16b were then stitched together with molybdenum wire.

The electrode 8 was then wrapped with edge-lapping (see FIG. 2), zirconia cloth separators 24a and 24b to prevent interelectrode short circuiting and insure positive containment of any particles which might sift their way through and out of the basket 16. The zirconia cloth 24 used was 0.76 mm thick, 83 percent porous, had a 5-H satin weave and is marketed by the Union Carbide Corporation under the name Zircar ZYW-30A.

The zirconia-wrapped electrode 8 was then wrapped in an open woven boron nitride cloth 28 having upper and lower halves 28a and 28b respectively as shown in FIG. 2. The BN cloth 28 served primarily to space the positive and negative electrodes uniformily from each other and, except for its pores which are filled with electrolyte, substantially fills the space between the zirconia separator 24 and the negative electrodes 10. Stainless steel screen 30 encages the entire BN-wrapped assembly to hold the several wrappings 24a, 24b, 28a and 28b in place and further firm up the positive electrode 8. The stainless steel screen 30 is electrochemically protected from the cell's operating environment by being maintained at the negative electrode potential by direct connection to the upper negative electrode 10 near the collar 44. The sulfur binder for the $FeS_2$ was then volatized by heating the entire assembly in a helium atmosphere at 0.101 MPa at 300° C. until all of the sulfur was removed.

Finally the wrapped positive electrode 8 was assembled in the can 2 between two negative Li-Al alloy electrodes 10 each comprising 55 mole percent lithium and having a 30 percent charged state porosity. Central stainless steel screens (i.e., about 150 mesh) 32 support and position the Li-Al alloy in the cell, are spot welded to the stainless steel can 2 and further serve to electrically connect the negative electrodes to the can 2 which serves as the negative terminal of the battery.

The rod 20 was electrically insulated from the stainless steel cover 4 by lead-through means 34 and served as the positive electrode lead. The lead-through means 34 included a compression fitting 35 having its male portion 36 welded to the stainless steel top 4 along the annular shoulder 38. A first BN insulator sheath 40 was fitted closely within the union 36, around the rod 20 and extended down through the conductive cover 4. The downwardly extending portion 42 of the insulating sheath 40 fitted snugly into a boron nitride collar 44 which in turn fitted snugly within an aperture 46 through the center of the upper Li-Al electrode 10 thereby electrically insulating the rod 20 from the negative electrode 10 inside the cell. A second BN insulator sheath 49 fitted closely around the uppermost portion of the rod 20 and was spaced from the first or lower insulating sheath 40 through a boron nitride powder-filled gap 48. A stainless steel compression ring 50 was fitted over the top of the upper insulating sheath 49 and engaged the shoulders 52 thereof. A stainless steel compression nut 54 engaged the top of the compression ring 50 and when turned down about the threads of the male portion 36 caused the sheath 46 to slide downwardly and compress the BN powder in the gap 48 to substantially effect the sealing off of the interior of the cell from the ambient.

The cell was filled with LiCl-KCl eutectic electrolyte by first heating the cell empty and under vacuum to about 475° C and then introducing molten salt into the cell through a filler tube 56 which was then used to admit a reference electrode, but could be pinched and welded shut after filling was complete. The cell was then placed on test cycling with the results indicated above.

While this invention has been disclosed primarily in terms of certain embodiments thereof, it is not intended that it be limited thereto but rather only to the extent set forth in the claims which follow.

What is claimed is:

1. A method for fabricating laminated $FeS_2$ electrodes for molten salt galvanic cells comprising the steps of:
    spreading a substantially homogeneous slurry of granular $FeS_2$ and molten sulfur into sheets;
    cooling said sheets to solidify said sulfur;
    sandwiching said sheets between electrically conductive, porous laminae which are permeable to said molten salt and are inert to the cells' thermal, chemical and electrochemical environment, and
    heating the thusly formed sandwich for a time and at a sufficient temperature and pressure to volatize and remove said sulfur from said sandwich.

2. A method for fabricating laminated $FeS_2$ electrodes for molten salt galvanic cells comprising the steps of:
    heating a sheet comprising an admixture of $FeS_2$ and sulfur to a temperature of at least about 250° C;
    rapidly solidifying said sheet to fix in the solid state the amorphism achieved in the sulfur at said temperature;
    sandwiching said sheet between electrically conductive, porous laminae which are permeable to said molten salt and are substantially inert to the cells' thermal, chemical and electrochemical environment; and
    heating the thusly formed sandwich for a time and at a temperature and pressure sufficient to volatize and remove said sulfur from said sandwich.

3. A method for fabricating laminated $FeS_2$ electrodes for molten salt galvanic cells comprising the steps of:
    coating an electrically conductive porous cloth with an admixture of $FeS_2$ and S heated sufficiently to melt said sulfur;
    cooling said coated cloth and solidifying said sulfur;
    forming said coated cloth into a laminate comprising alternating cloth and $FeS_2$-S layers; and
    heating said laminate for a time and at a temperature and pressure sufficient to volatize and remove said sulfur from said laminate.

4. A method for fabricating $FeS_2$ electrodes for molten salt galvanic cells comprising the steps of:
    sheeting a substantially homogeneous slurry of granular $FeS_2$ and sulfur at a temperature of at least about 300° C;
    rapidly quenching said sheeted slurry to below its freezing point to impart flexibility to the solidified slurry;
    integrating the solidified slurry with an electrical conductor; and heating the integrated mass for a time and at a temperature and reduced pressure sufficient to volatize and remove said sulfur therefrom.

* * * * *